(12) United States Patent
Rice et al.

(10) Patent No.: US 8,947,822 B1
(45) Date of Patent: Feb. 3, 2015

(54) DISK DRIVE ADJUSTING FLY HEIGHT BASED ON AIR DENSITY MEASURED FROM RATE OF TEMPERATURE CHANGE

(75) Inventors: Alan P. Rice, Santa Ana, CA (US); Timothy A. Ferris, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 986 days.

(21) Appl. No.: 12/478,606

(22) Filed: Jun. 4, 2009

(51) Int. Cl.
*G11B 21/02* (2006.01)

(52) U.S. Cl.
USPC .......................................................... 360/75

(58) Field of Classification Search
None
See application file for complete search history.

(56) References Cited

U.S. PATENT DOCUMENTS

| | | | |
|---|---|---|---|
| 4,625,545 A | 12/1986 | Holm et al. | |
| 5,454,157 A | 10/1995 | Ananth et al. | |
| 5,825,581 A | 10/1998 | Morita et al. | |
| 5,978,163 A | 11/1999 | Cunningham | |
| 6,055,120 A | 4/2000 | Schirle | |
| 6,078,455 A | 6/2000 | Enarson et al. | |
| 6,088,662 A | 7/2000 | Flinsbaugh et al. | |
| 6,266,203 B1 | 7/2001 | Street et al. | |
| 6,392,838 B1 | 5/2002 | Hearn et al. | |
| 6,525,899 B2 | 2/2003 | Hearn et al. | |
| 6,567,235 B2 | 5/2003 | Kasetty et al. | |
| 6,580,574 B1 | 6/2003 | Codilian | |
| 6,603,628 B1 | 8/2003 | Gillis et al. | |
| 6,644,362 B2 | 11/2003 | Bernett | |
| 6,646,821 B2 | 11/2003 | Bernett et al. | |
| 6,683,747 B2 | 1/2004 | Bernett | |
| 6,731,453 B2 | 5/2004 | Korbel et al. | |
| 6,741,955 B2 | 5/2004 | Rutherford et al. | |
| 6,744,586 B2 | 6/2004 | Ukani et al. | |
| 6,819,517 B2 | 11/2004 | Fioravanti et al. | |
| 6,958,876 B2 | 10/2005 | Feliss et al. | |
| 7,009,800 B2 | 3/2006 | Yang | |
| 7,016,145 B2 | 3/2006 | Gunderson et al. | |
| 7,062,387 B1 | 6/2006 | Burns et al. | |
| 7,079,348 B2 | 7/2006 | Ishii et al. | |
| 7,101,031 B2 | 9/2006 | Medin | |
| 7,236,321 B1 | 6/2007 | Fukushima | |
| 7,280,306 B2 | 10/2007 | Tanaka et al. | |
| 7,417,820 B2 * | 8/2008 | Otsuki et al. | 360/75 |
| 7,426,089 B2 * | 9/2008 | Wada et al. | 360/75 |
| 7,434,987 B1 | 10/2008 | Gustafson et al. | |
| 7,620,519 B2 * | 11/2009 | Yoon | 702/166 |
| 2003/0179489 A1 | 9/2003 | Bernett et al. | |
| 2004/0264028 A1 | 12/2004 | Ishii et al. | |
| 2007/0159708 A1 | 7/2007 | Fukushima | |
| 2008/0068755 A1 | 3/2008 | Aoyagi et al. | |
| 2008/0186621 A1 | 8/2008 | Partee | |
| 2009/0296271 A1 | 12/2009 | Feliss et al. | |

FOREIGN PATENT DOCUMENTS

| | | |
|---|---|---|
| JP | 62058484 A2 | 3/1987 |
| JP | 2003303402 A | 4/2002 |
| KR | 838877 B1 | 6/2008 |

* cited by examiner

Primary Examiner — K. Wong (57) ABSTRACT

A disk drive is disclosed comprising a head actuated over a disk, wherein the head comprises a dynamic fly height (DFH) actuator. The disk drive further comprises an electrical heating element, and control circuitry operable to select an operating control signal applied to the DFH actuator by heating the electrical heating element for a first heating time, measuring a rate of temperature change of the electrical heating element, and selecting the operating control signal applied to the DFH actuator in response to the rate of temperature change.

19 Claims, 8 Drawing Sheets

DISK DRIVE ADJUSTING FLY HEIGHT BASED ON AIR DENSITY MEASURED FROM RATE OF TEMPERATURE CHANGE

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable fly height actuator may be employed, such as a heater which controls fly height through thermal expansion, or a piezoelectric (PZT) actuator. It is therefore desirable to determine the appropriate control signal applied to the actuator that achieves the target fly height for the head.

DETAILED DESCRIPTION OF EMBODIMENTS OF THE INVENTION

Figures 1A, 1B:
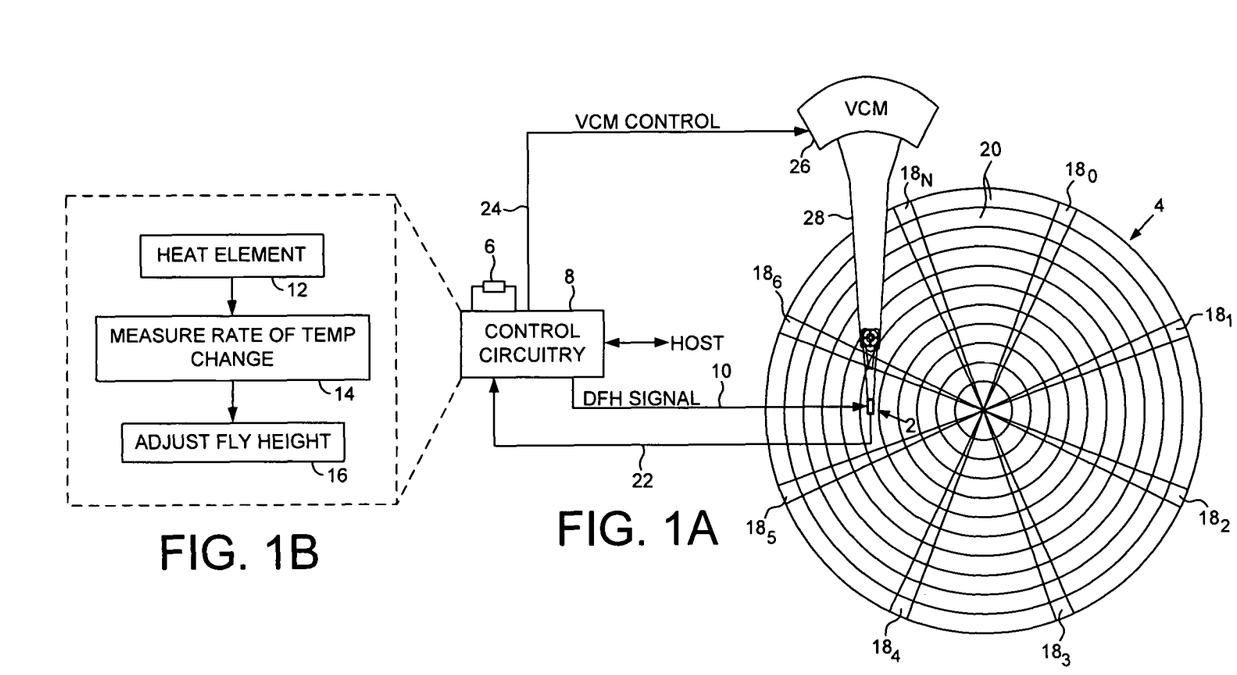
FIG. 1A shows a disk drive according to an embodiment of the present invention comprising a head actuated over a disk, an electrical heating element, and control circuitry.
FIG. 1B is a flow diagram executed by the control circuitry for measuring a rate of temperature change of the electrical heating element when calibrating a fly height for the head according to an embodiment of the present invention.

FIG. 1A shows a disk drive according to an embodiment of the present invention comprising a head 2 actuated over a disk 4, wherein the head 2 comprises a dynamic fly height (DFH) actuator. The disk drive further comprises an electrical heating element 6, and control circuitry 8 operable to execute the flow diagram of FIG. 1B in order to select an operating control signal 10 applied to the DFH actuator. The electrical heating element is heated for a first heating time (step 12), a rate of temperature change of the electrical heating element is measured (step 14), and the operating control signal applied to the DFH actuator is selected in response to the rate of temperature change (step 16).

In the embodiment of FIG. 1A, the disk 4 comprises a plurality of servo sectors $18_0$-$18_N$ that define a plurality of data tracks 20. The control circuitry 8 processes a read signal 22 to demodulate the servo sectors $18_0$-$18_N$ into a position error signal (PES). The PES is filtered with a suitable compensation filter to generate a control signal 24 applied to a voice coil motor (VCM) 26 which pivots an actuator arm 28 to position the head 2 radially over the disk 4 in a direction that reduces the PES. The servo sectors $18_0$-$18_N$ may comprise any suitable position information, such as a track address for coarse positioning and servo bursts for fine positioning.

Figure 2A:
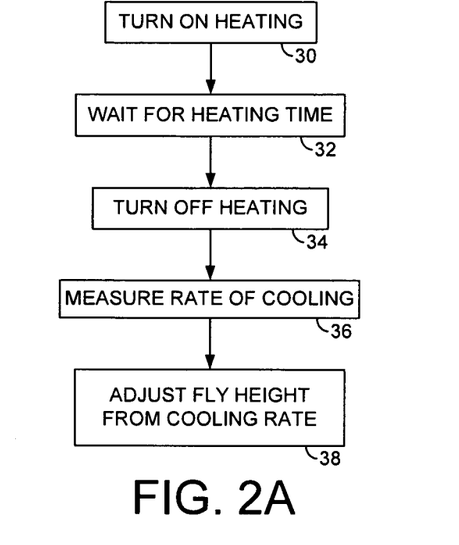
FIG. 2A is a flow diagram according to an embodiment of the present invention wherein a rate of cooling is measured to adjust the fly height.

FIG. 2A is a flow diagram according to an embodiment of the present invention for selecting an operating control signal applied to the DFH actuator. A heating power is applied to the electrical heating element (step 30) for a predetermined heating time (step 32). The heating power is then turned off (step 34) and a rate of cooling of the electrical heating element is measured (step 36). The control signal applied to the DFH actuator is selected in response to the rate of cooling (step 38).

Figure 2B:
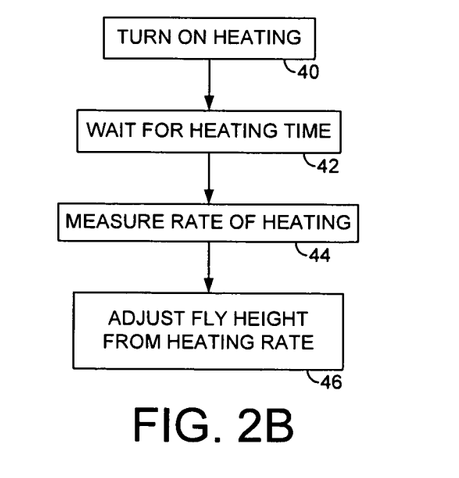
FIG. 2B is a flow diagram according to an embodiment of the present invention wherein a rate of heating is measured to adjust the fly height.

FIG. 2B is a flow diagram according to an embodiment of the present invention for selecting an operating control signal applied to the DFH actuator. A heating power is applied to the electrical heating element (step 40) for a predetermined heating time (step 42). A rate of heating of the electrical heating element is measured (step 44), and the control signal applied to the DFH actuator is selected in response to the rate of heating (step 46).

Figure 3A:
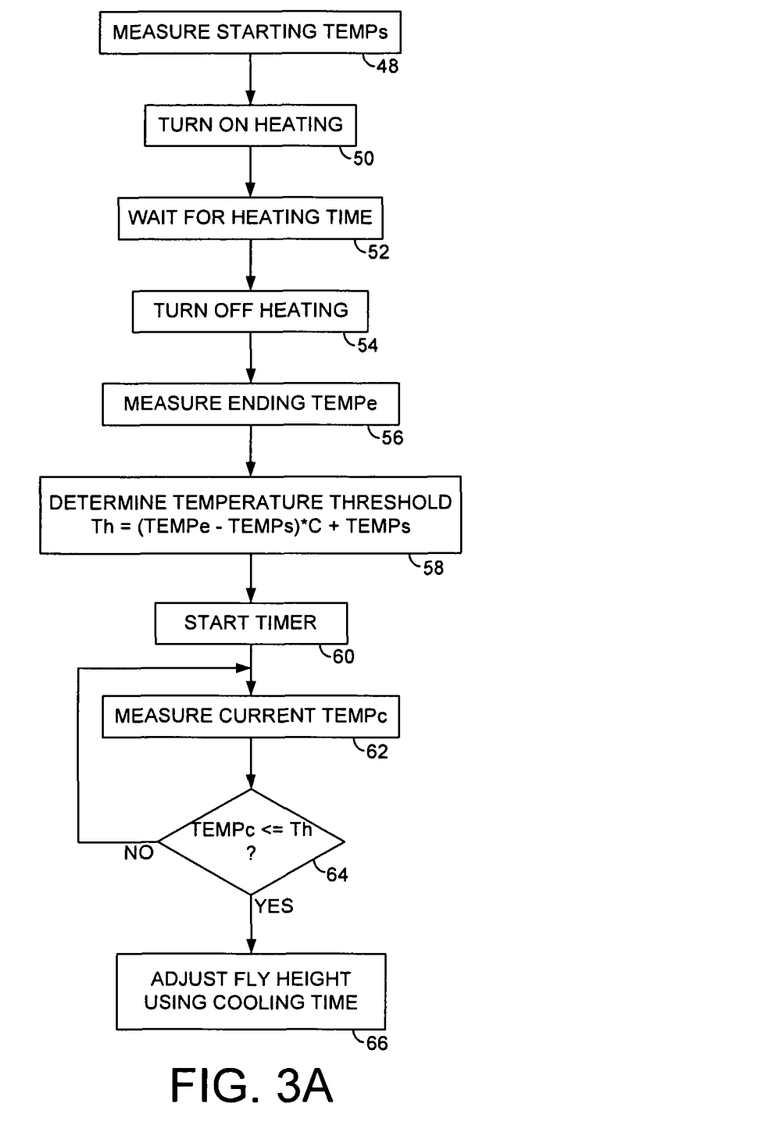
FIG. 3A is a flow diagram according to an embodiment of the present invention wherein a cooling time needed to cool the electrical heating element to a target temperature is measured.

Any suitable algorithm may be employed to measure the rate of cooling of the electrical heating element after applying the heating power. FIG. 3A is a flow diagram according to an embodiment of the present invention wherein the starting temperature (TEMPs) of the electrical heating element is measured (step 48) prior to applying the heating power to the heating element (step 50). After waiting for the heating time (step 52), the heating power is turned off (step 54) and the ending temperature (TEMPe) of the electrical heating element is measured (step 56). A temperature threshold is determined (step 58) according to:

$$(TEMPe-TEMPs)*C+TEMPs$$

where C is a predetermined scalar. A timer is started (step 60) and the temperature of the electrical heating element is measured (step 62) until the temperature falls below the threshold (step 64). The control signal applied to the DFH actuator is selected based on the cooling time for the electrical heating element to cool to the temperature threshold (step 66).

Figure 3B:
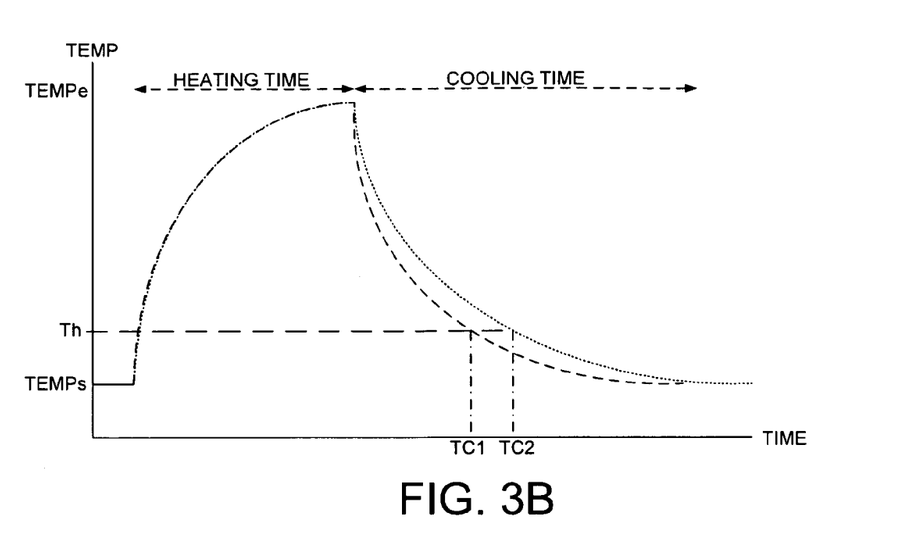
FIG. 3B illustrates how the cooling time varies based on the air density according to an embodiment of the present invention.

FIG. 3B illustrates an example of the flow diagram of FIG. 3A for two different air densities within the disk drive. At a first air density, a first cooling time (TC1) is needed to cool the electrical heating element to the temperature threshold, whereas at a second lower air density, a second cooling time (TC2) is needed to cool the electrical heating element to the temperature threshold. In one embodiment, the cooling time indexes a table of DFH actuator settings, and in an alternative embodiment, the cooling time may be input into a function that computes the desired DFH actuator setting.

Figure 4A:
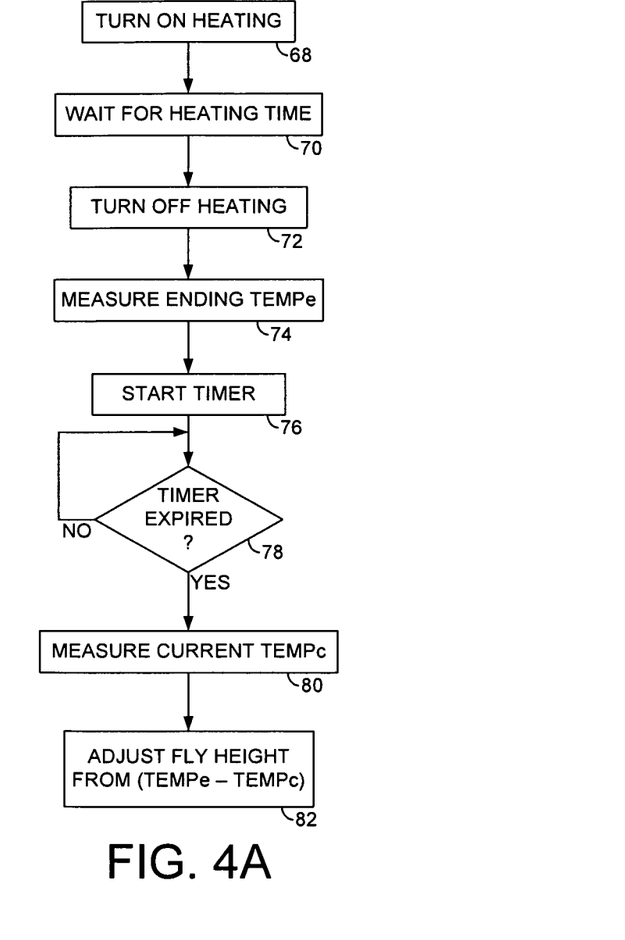
FIG. 4A is a flow diagram according to an embodiment of the present invention wherein an ending temperature is measured after a cooling time.

FIG. 4A is a flow diagram according to an alternative embodiment of the present invention for selecting an operating control signal applied to the DFH actuator. After applying the heating power (step 68) for the heating time (step 70) and turning of the heating power (step 72), the ending temperature (TEMPe) of the electrical heating element is measured (step 74). A timer is then started (step 76) and after a predetermined interval (step 78) the current temperature (TEMPc) of the electrical heating element is measured (step 80). The control signal applied to the DFH actuator is selected in response to the difference between TEMPe and TEMPc (step 82).

Figure 4B:
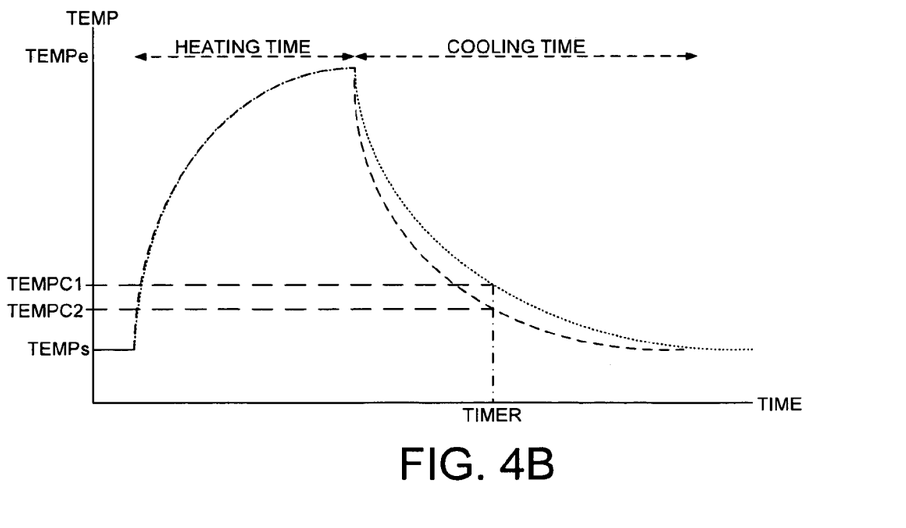
FIG. 4B illustrates how the ending temperature after the cooling time varies based on the air density according to an embodiment of the present invention.

FIG. 4B illustrates an example of the flow diagram of FIG. 4A for two different air densities within the disk drive. At a first air density, the electrical heating element cools to a first temperature (TEMPC1) after the cooling interval, whereas at a second lower air density, the electrical heating element cools to a second temperature (TEMPC2) after the cooling interval. In one embodiment, the measured temperature indexes a table of DFH actuator settings, and in an alternative embodiment, the measured temperature may be input into a function that computes the desired DFH actuator setting.

Figure 5A:
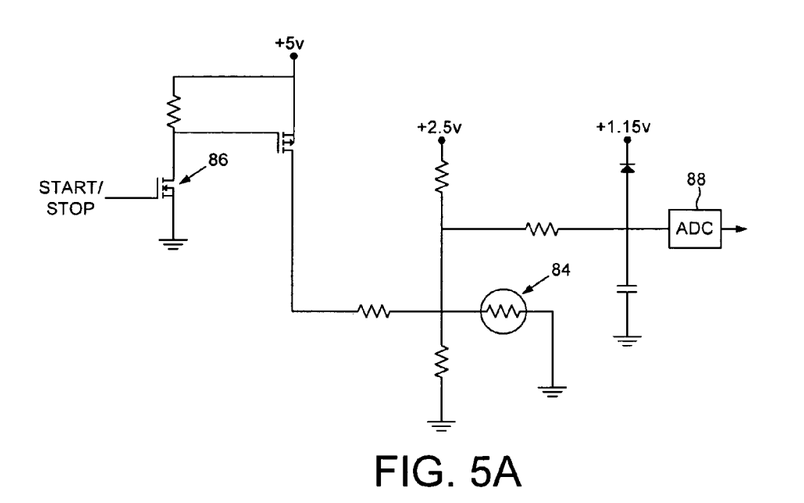
FIG. 5A shows control circuitry according to an embodiment of the present invention for measuring the cooling rate of the electrical heating element.
Figure 5B:
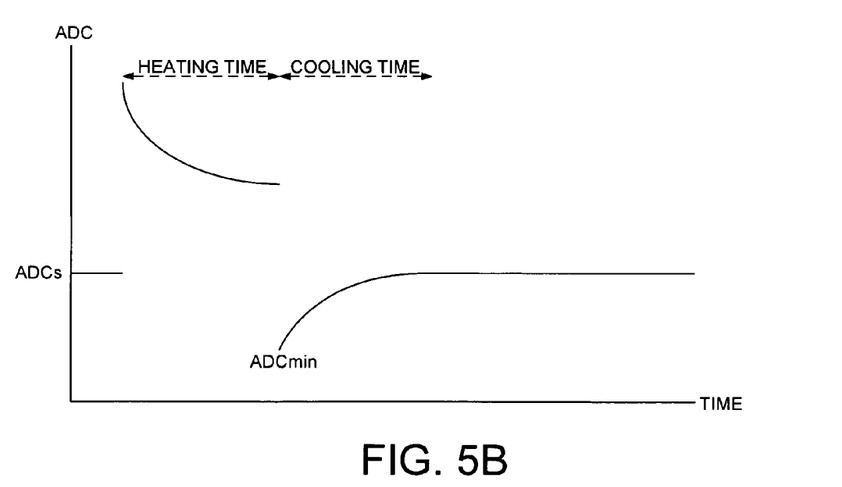
FIG. 5B is a waveform illustrating operation of the control circuitry of FIG. 5A.

FIG. 5A shows control circuitry according to an embodiment of the present invention wherein the electrical heating element comprises a thermistor 84 having a resistance which varies inversely with temperature. When transistor 86 is turned on at the beginning of the heating period, the current heats the thermistor 84 causing it's resistance and associated voltage (as measured by ADC 88) to decrease exponentially as shown in FIG. 5B. When the transistor 86 is turned off at the end of the heating period, the thermistor begins cooling causing the resistance and associated voltage to increase exponentially. The rate of temperature change (heating and/or cooling) as reflected by the exponential curves depend on the air density within the disk drive. Therefore, in one embodiment the rate of temperature change which indicates the current air density is used to select the DFH actuator setting and corresponding fly height.

Figure 6:
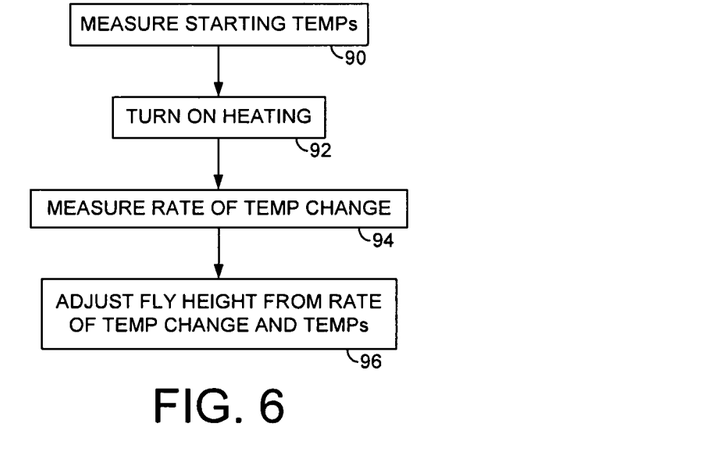
FIG. 6 is a flow diagram according to an embodiment of the present invention wherein a starting temperature of the electrical heating element is measured and used to select the operating fly height for the head.

In one embodiment, the rate of temperature change (e.g., the exponential curves shown in FIG. 5B) may vary depending on the starting temperature (the ambient temperature) before the heating power is applied to the electrical heating element. Therefore, in one embodiment shown in the flow diagram of FIG. 6, the starting temperature of the electrical heating element is measured (step 90) just prior to applying the heating power (step 92). After measuring the rate of temperature change (step 94), the control signal applied to the DFH actuator is selected in response to the rate of temperature change and the starting temperature (TEMPs). For example, these variables may be used to index a two dimensional table, or they may be input into a function that computes the desired DFH actuator setting.

Figure 7A:
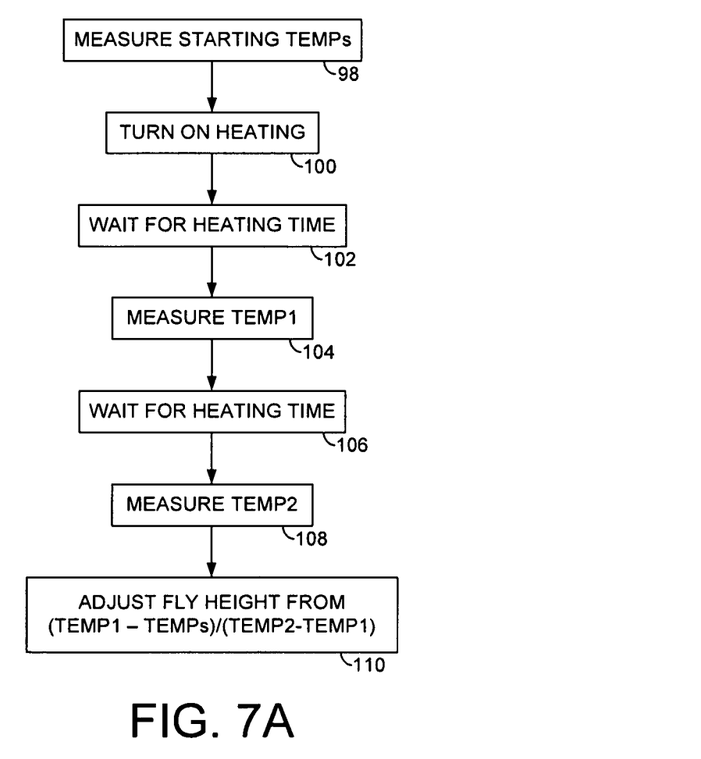
FIG. 7A is a flow diagram according to an embodiment of the present invention wherein a rate of heating of the electrical heating element is measured to select the operating fly height of the head.

FIG. 7A is a flow diagram according to an embodiment of the present invention wherein a rate of heating is measured to select the DFH actuator setting. The starting temperature (TEMPs) of the electrical heating element is measured (step 98). The heating power is applied to the electrical heating element (step 100) for a first heating time (step 102), and then a first temperature (TEMP1) is measured (step 104). After a second heating time (step 106) a second temperature (TEMP2) is measured (step 108). The control signal applied to the DFH actuator is selected in response to a ratio computed as:

(TEMP1−TEMPs)/(TEMP2−TEMP1).

Figure 7B:
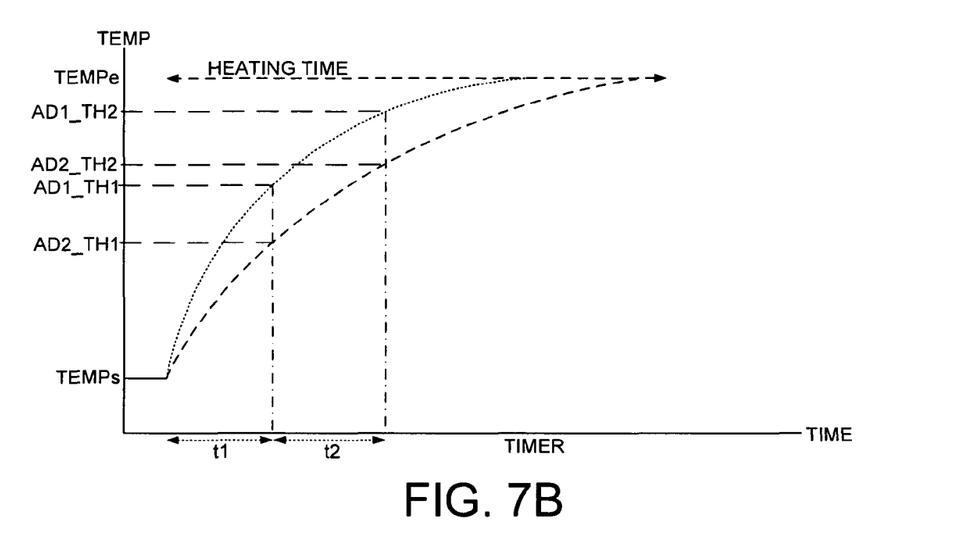
FIG. 7B illustrates how the rate of heating of the electrical heating element varies based on the air density according to an embodiment of the present invention.

FIG. 7B illustrates an example of the flow diagram of FIG. 7A for two different air densities within the disk drive. At a first air density (AD1), a first temperature (AD1_TH1) is measured after a first heating time t1, and a second temperature (AD1_TH2) is measured after a second heating time t2. At a second lower air density (AD2), a first temperature (AD2_TH1) is measured after a first heating time t1, and a second temperature (AD2_TH2) is measured after a second heating time t2. In one embodiment, the above ratio indexes a table of DFH actuator settings, and in an alternative embodiment, the ratio may be input into a function that computes the desired DFH actuator setting. As described above with reference to FIG. 6, the starting temperature (TEMPs) may also adjust the table value or computed value since the rate of heating may vary depending on the starting ambient temperature of the electrical heating element.

Figure 8:
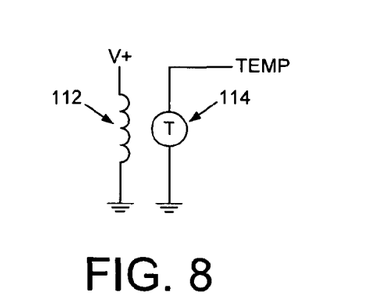
FIG. 8 shows an embodiment of the present invention wherein a temperature sensor is located proximate the electrical heating element.

Any suitable electrical heating element and control circuitry for measuring a rate of temperature change of the electrical heating element may be employed in the embodiments of the present invention. In the embodiment of FIG. 5A, the electrical heating element and temperature sensor are integrated into a thermistor having a resistance that varies inversely with temperature. In an alternative embodiment shown in FIG. 8, the electrical heating element may comprise a coil 112 or other passive component that is heated with current, and a separate temperature sensor 114 located proximate the electrical heating element for measuring the heat radiating from the coil 112.

In one embodiment, the electrical heating element is mounted in the disk drive at a location that is exposed to the windage generated as the disk rotates. For example, the electrical heating element may be mounted near (or integrated with) a flex circuit that couples a preamp circuit to other control circuitry (e.g., a read channel circuit), or mounted on the actuator arm near the preamp circuit. In this embodiment, the affect the windage has on the rate of temperature change of the electrical heating element depends on the air density. That is, the rate the windage carries heat energy away from the electrical heating element depends on the air density, and therefore the rate of temperature change is a measure of air density.

In other embodiments of the present invention, the rate of temperature change of the electrical heating element may be measured with techniques other than those described above. For example, a derivative of the measured temperature signal may be computed using analog or digital circuitry. In another embodiment, the temperature signal may be sampled and then curve fit to a suitable function (e.g., an exponential function) which represents the rate of temperature change.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk;
a head actuated over the disk, wherein the head comprises a dynamic fly height (DFH) actuator;
an electrical heating element; and
control circuitry operable to select an operating control signal applied to the DFH actuator by:
heating the electrical heating element for a first heating time;
measuring a rate of temperature change of the electrical heating element; and
selecting the operating control signal applied to the DFH actuator in response to the rate of temperature change.

2. The disk drive as recited in claim 1, wherein the rate of temperature change is a rate of cooling.

3. The disk drive as recited in claim 1, wherein the rate of temperature change is a rate of heating.

4. The disk drive as recited in claim 1, wherein the control circuitry is further operable to select the operating control signal applied to the DFH actuator by measuring a starting temperature (TEMPs) of the electrical heating element before heating the heating element.

5. The disk drive as recited in claim 4, wherein the control circuitry is further operable to select the operating control signal applied to the DFH actuator by:
measuring an ending temperature (TEMPe) of the electrical heating element after the first heating time;
determining a temperature threshold in response to TEMPs and TEMPe; and
measuring a cooling time required for the temperature of the electrical heating element to cool to the temperature threshold.

6. The disk drive as recited in claim 5, wherein temperature threshold is determined as:

(TEMPe−TEMPs)*C+TEMPs.

7. The disk drive as recited in claim 2, wherein the control circuitry is further operable to select the operating control signal applied to the DFH actuator by:
measuring an ending temperature (TEMPe) of the electrical heating element after the first heating time;
waiting for a predetermined cooling time after the first heating time;
measuring a cooled temperature (TEMPc) of the electrical heating element after the cooling time; and
select the operating control signal applied to the DFH actuator in response to the TEMPe and the TEMPc.

8. The disk drive as recited in claim 3, wherein the control circuitry is further operable to select the operating control signal applied to the DFH actuator by:
measuring a first temperature (TEMP1) of the electrical heating element after the first heating time;
heating the electrical heating element for a second heating time;
measuring a second temperature (TEMP2) of the electrical heating element after the second heating time;
selecting the operating control signal applied to the DFH actuator in response to the TEMP1 and the TEMP2.

9. The disk drive as recited in claim 1, wherein the electrical heating element comprises a thermistor.

10. The disk drive as recited in claim 1, further comprising a temperature sensor located proximate the electrical heating element.

11. A method of operating a disk drive, the disk drive comprising a disk, a head actuated over the disk, wherein the head comprises a dynamic fly height (DFH) actuator, and an electrical heating element, the method comprising:
heating the electrical heating element for a first heating time;
measuring a rate of temperature change of the electrical heating element; and
selecting an operating control signal applied to the DFH actuator in response to the rate of temperature change.

12. The method as recited in claim 11, wherein the rate of temperature change is a rate of cooling.

13. The method as recited in claim 11, wherein the rate of temperature change is a rate of heating.

14. The method as recited in claim 11, further comprising measuring a starting temperature (TEMPs) of the electrical heating element before heating the heating element.

15. The method as recited in claim 14, further comprising:
measuring an ending temperature (TEMPe) of the electrical heating element after the first heating time;
determining a temperature threshold in response to TEMPs and TEMPe; and
measuring a cooling time required for the temperature of the electrical heating element to cool to the temperature threshold.

16. The method as recited in claim 15, wherein temperature threshold is determined as:

(TEMPe−TEMPs)*C+TEMPs.

17. The method as recited in claim 12, further comprising:
measuring an ending temperature (TEMPe) of the electrical heating element after the first heating time;
waiting for a predetermined cooling time after the first heating time;
measuring a cooled temperature (TEMPc) of the electrical heating element after the cooling time; and
selecting the operating control signal applied to the DFH actuator in response to the TEMPe and the TEMPc.

18. The method as recited in claim 13, further comprising:
measuring a first temperature (TEMP1) of the electrical heating element after the first heating time;
heating the electrical heating element for a second heating time;
measuring a second temperature (TEMP2) of the electrical heating element after the second heating time;
selecting the operating control signal applied to the DFH actuator in response to the TEMP1 and the TEMP2.

19. The method as recited in claim 11, wherein the electrical heating element comprises a thermistor.

\* \* \* \* \*